(12) United States Patent
Bassi et al.

(10) Patent No.: US 6,398,081 B2
(45) Date of Patent: Jun. 4, 2002

(54) VOLUMETRIC PUMP

(75) Inventors: Luigi Bassi, Lodi; Stefano Oggioni, Milan, both of (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/863,966

(22) Filed: May 23, 2001

(30) Foreign Application Priority Data

May 31, 2000 (GB) .............................................. 0013133

(51) Int. Cl.[7] .............................................. B65D 47/00
(52) U.S. Cl. ........................ 222/333; 222/476; 222/504
(58) Field of Search ................................. 222/333, 255, 222/384, 476, 501, 559

(56) References Cited

U.S. PATENT DOCUMENTS 4,030,640 A * 6/1977 Citrin et al. ................. 222/504
4,759,479 A * 7/1988 Tinnes ......................... 222/559
5,887,768 A * 3/1999 Price et al. .................. 222/504
6,267,266 B1 * 7/2001 Smith et al. ................. 222/504

* cited by examiner

Primary Examiner—Joseph A. Kaufman
(74) Attorney, Agent, or Firm—Lawrence R. Fraley

(57) ABSTRACT

A volumetric pump for dispensing a controlled and continuous flow of viscous fluid. The pump according to a preferred embodiment of the present invention can ideally dispense from a minimum of 1 mg/sec to 1 g/sec for fluids with a viscosity from 2,000,000 cps (Centipoise) down to 10,000 cps. Such flexibility in the range of viscosity extends the application fields of this pump to microelectronics as well as automotive and consumer products manufacturing. Two cams mounted with an opposing position of 180° on the same shaft generate an alternate motion of two concentric pistons. The alternate movement of the external piston in one phase pumps out the material through a dispensing needle and allows in the returning phase the viscous fluid to be charged in the dispensing chamber from the feeding container. The alternate movement opens and closes the vents during the different working phases.

10 Claims, 5 Drawing Sheets

PHASE 3

PHASE 4

VOLUMETRIC PUMP

FIELD OF INVENTION

The present invention relates to a system for dispensing a continuous flow of viscous fluid and more particularly to a volumetric pump for dispensing a controlled and continuous flow of viscous fluid.

BACKGROUND OF THE INVENTION

In many industrial manufacturing processes (e.g. the manufacturing process of electronic packages), there is the need to dispense a flow of viscous material. When this dispensing must produce a regular and thin thread (e.g. less than 1 mm diameter) the equipment must be able to provide a flow with a continuous and controlled dispensing rate. It is known to perform the above operation by means of a volumetric pump.

Two different types of volumetric pumps are currently available on the market. The first type is called an Auger valve pump, which uses an Archimede's screw configuration. This kind of pump is suitable for dispensing constant volumes of material at constant temperature and constant viscosity. The results of these pumps strongly depend on the two parameters: temperature and viscosity; if these change, the dispensed flow will be different. For the above problem, these pumps are also known as "Pseudo-volumetric pumps". Functionally, these pumps have an helicoidal chamber with an endless screw that pushes the material through an outlet. This kind of pump is prone to failure if the material to be dispensed has a non optimized Theological behavior. These pumps are only suitable for those materials having good rheological properties, because they need to bear the stress and the deformation caused by applied mechanical forces, that make the materials flow in a rather long and complex path. The combination of pressure and attrition may break the material (e.g. gel compositions may break into their main subconstituents when undergoing mechanical attrition and pressure); that is, the material may change its physical properties. These pumps are available for materials with a viscosity above 100,000 cps (i.e. centipoise) and for a maximum dispensing rate of 10 mg/sec.

The second type of pump available on the market is called a Linear or Positive Displacements piston pump. These pumps have a loading chamber and a pushing piston. Material is loaded and dispensed through a single piston movement that alternatively loads by sucking up the material from a reservoir when it moves back in the chamber and pushes the material out when the piston moves forward. These pumps force the user either to: (1) experience delays in the dispensing operation while the pump at the end of one piston revolution has to reload material to continue the dispensing operation; or (2) use a multiple pump configuration to guarantee a continuous flow of material.

It is an object of the present invention to provide a technique which overcomes the above drawbacks.

DISCLOSURE OF THE INVENTION

According to the present invention, we provide a pump for dispensing viscous fluid comprising a chamber including an inlet aperture, being connectable with a reservoir, and a dispensing outlet aperture, a first and a second piston within said chamber, said first and said second piston being movable in anti-phase, said first piston, in use, reciprocating to periodically open and close said inlet aperture and said second piston, in use, reciprocating to periodically open and close said outlet aperture.

BRIEF DESCRIPTION OF THE DRAWINGS

Various embodiments of the invention will now be described in detail by way of examples, with reference to accompanying figures, where.

DESCRIPTION OF THE PREFERRED EMBODIMENTS

The volumetric pump of the present invention dispenses a continuous flow of material. This pump can work with adhesives, resins, pastes and other materials in all applications where a controlled volume of material should be dispensed continuously and uniformly. In other words the ratio $k=V/t$, where V is Volume of fluid dispensed and t is time, is substantially constant.

Figure 1:
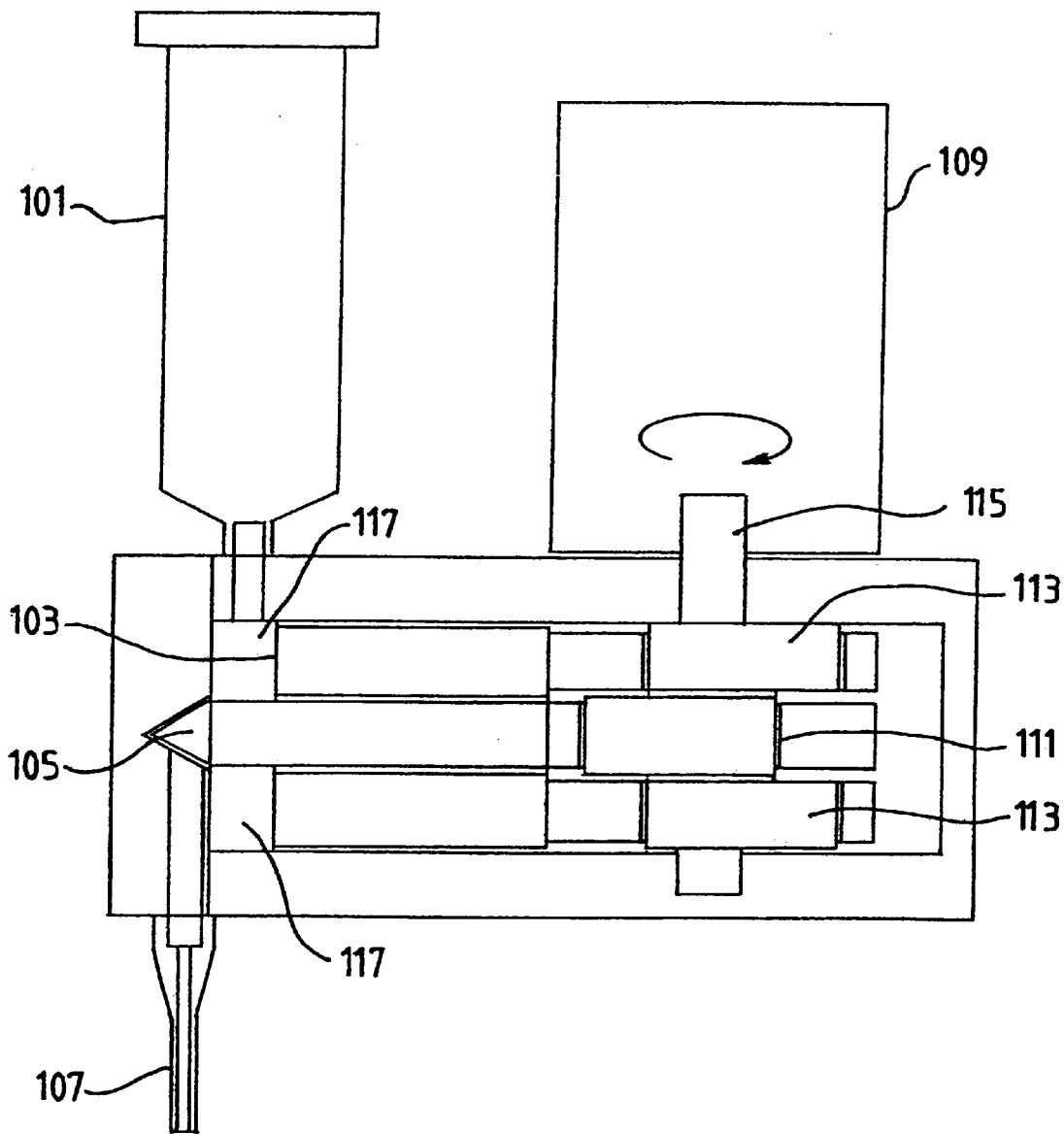
FIG. 1 shows a volumetric pump according to a preferred embodiment of the present invention.
Figure 2:
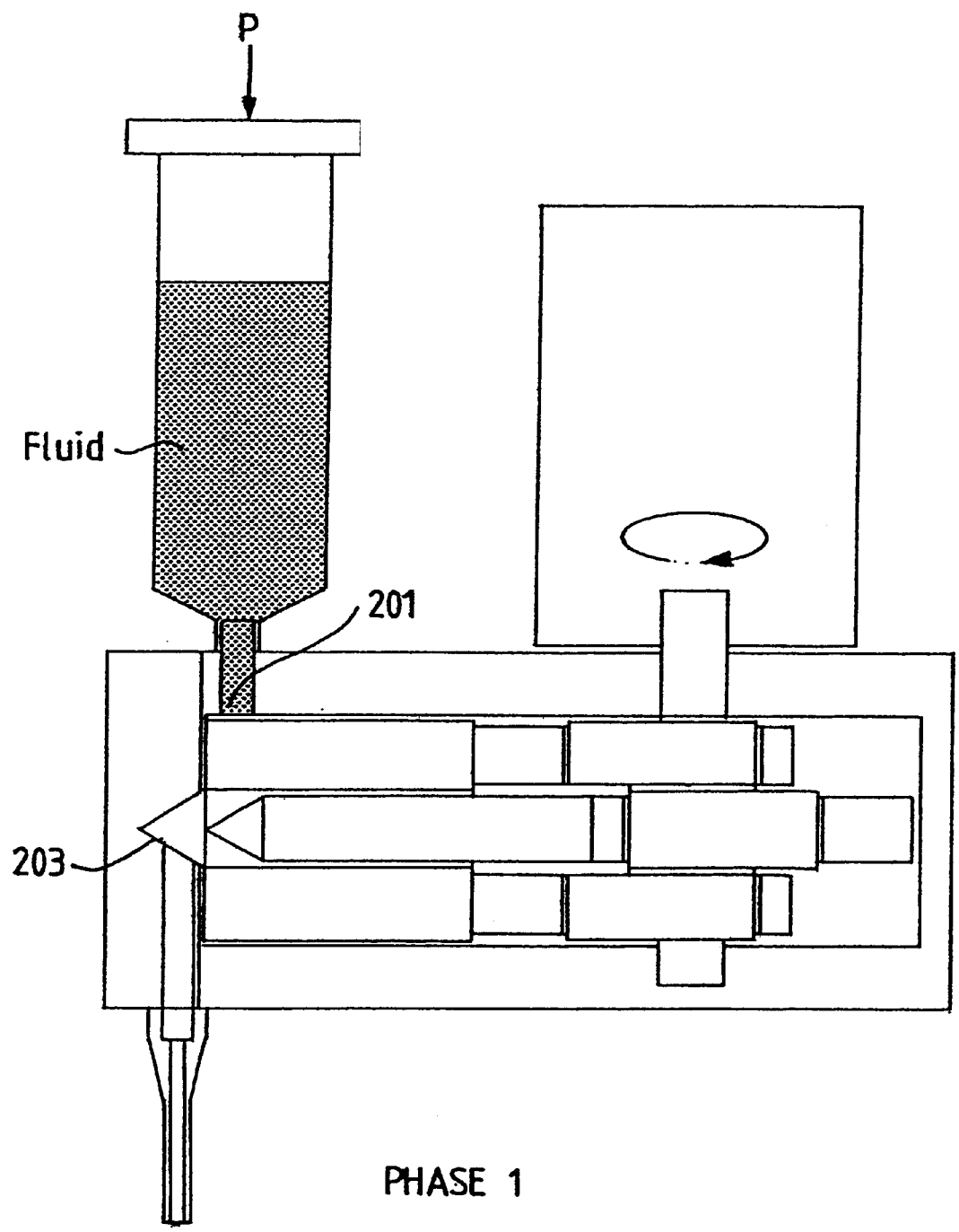
FIGS. 2–5 schematically show the different operation phases of a volumetric pump according to a preferred embodiment of the present invention.

With reference to FIG. 1, the pump according to a preferred embodiment of the present invention includes a body (housing) which contains a chamber 117. The chamber 117 has an inlet aperture 201 (FIG. 2) communicating with a reservoir 101, from where the viscous fluid is charged, and an outlet aperture 203 (FIG. 2), connected to a needle through which the viscous fluid is dispensed. According to a preferred embodiment of the present invention, a pressure may be applied to the fluid in the reservoir to force it into the chamber 117 through the inlet 201. Within the chamber, two pistons 103 and 105 reciprocate in anti-phase so that one of them (103) periodically opens and closes the inlet aperture, while the other one (105) periodically opens and closes the outlet aperture. According to a preferred embodiment of the present invention the two pistons 103 and 105 are running one inside the other, so that the external one (103) acts as a cylindric sleeve for the inner cylindric piston 105.

As shown in FIG. 1 (which is not a scale drawing), two circular cams 111 and 113 are mounted with an opposing position of 180° on the same shaft 115 and connected with the two pistons 103 and 105. A motor 109 rotates the cam shaft 115 generating an alternate motion of two pistons 103 and 105. According to a preferred embodiment of the present invention, the two pistons are concentric. The alternate motion of the external piston 103 in one phase pumps out the material through the dispensing needle 107 and, in the returning phase, allows the viscous fluid to be charged in the dispensing chamber 117 from the reservoir 101.

Figure 3:
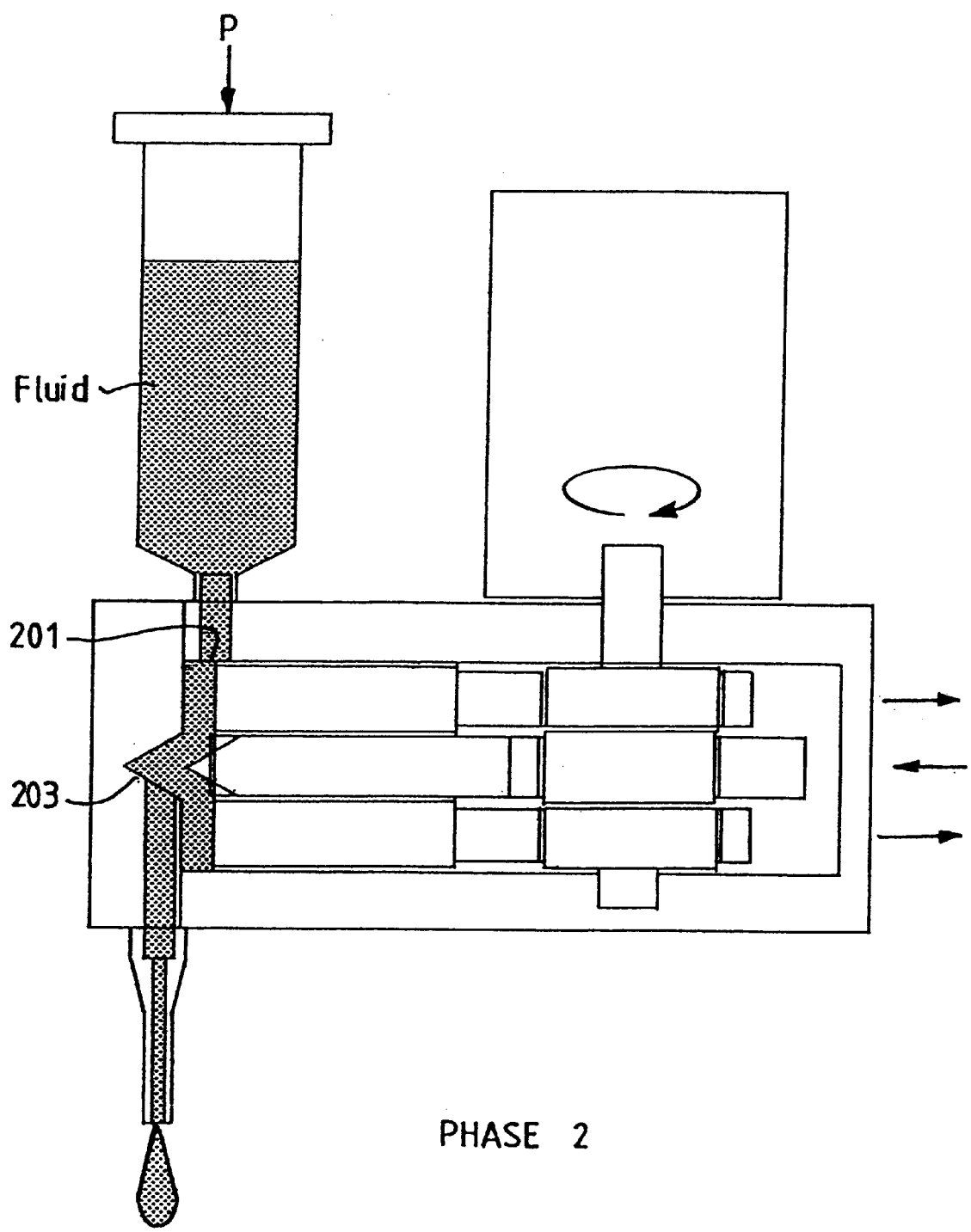
Figure 4:
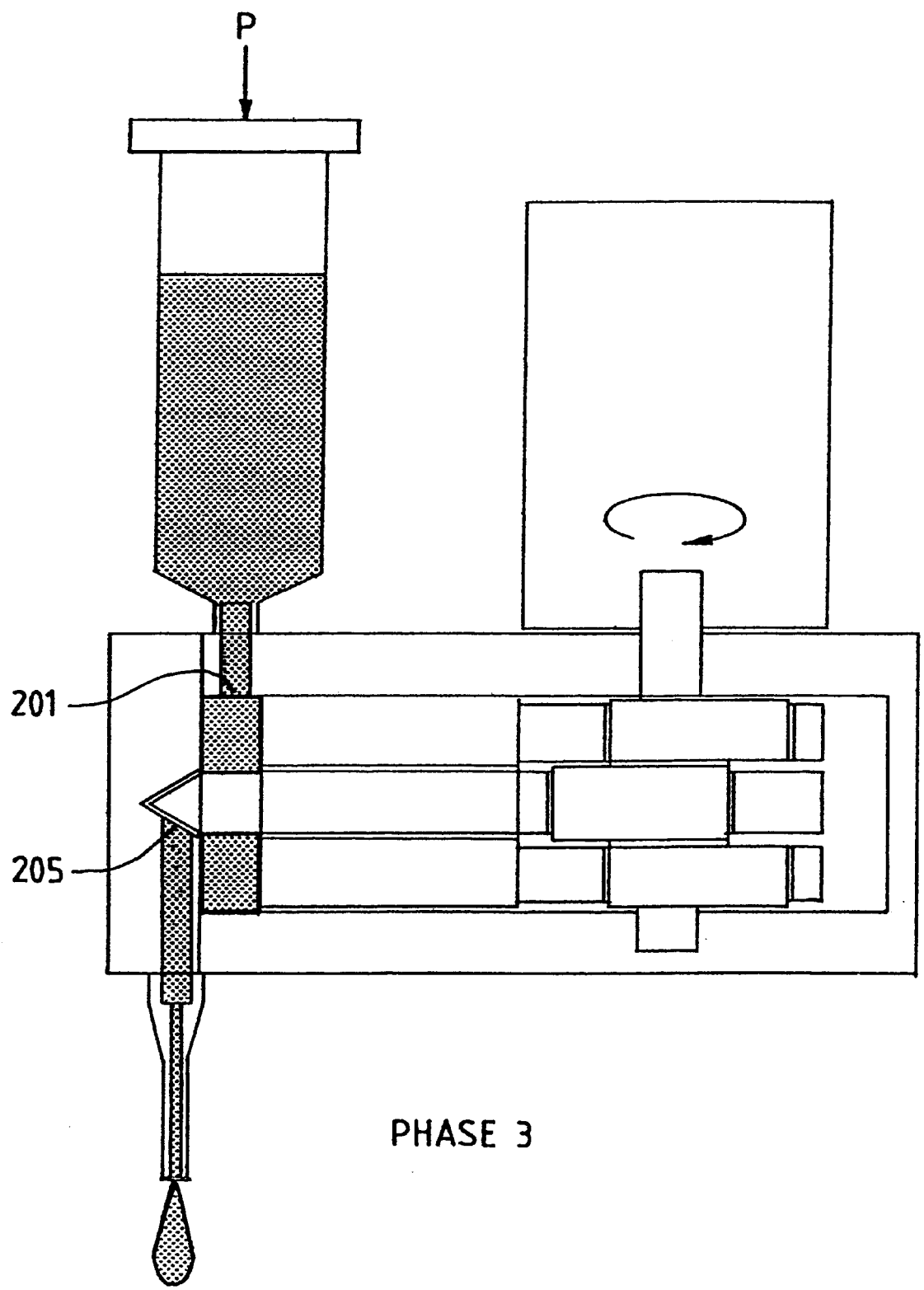
Figure 5:
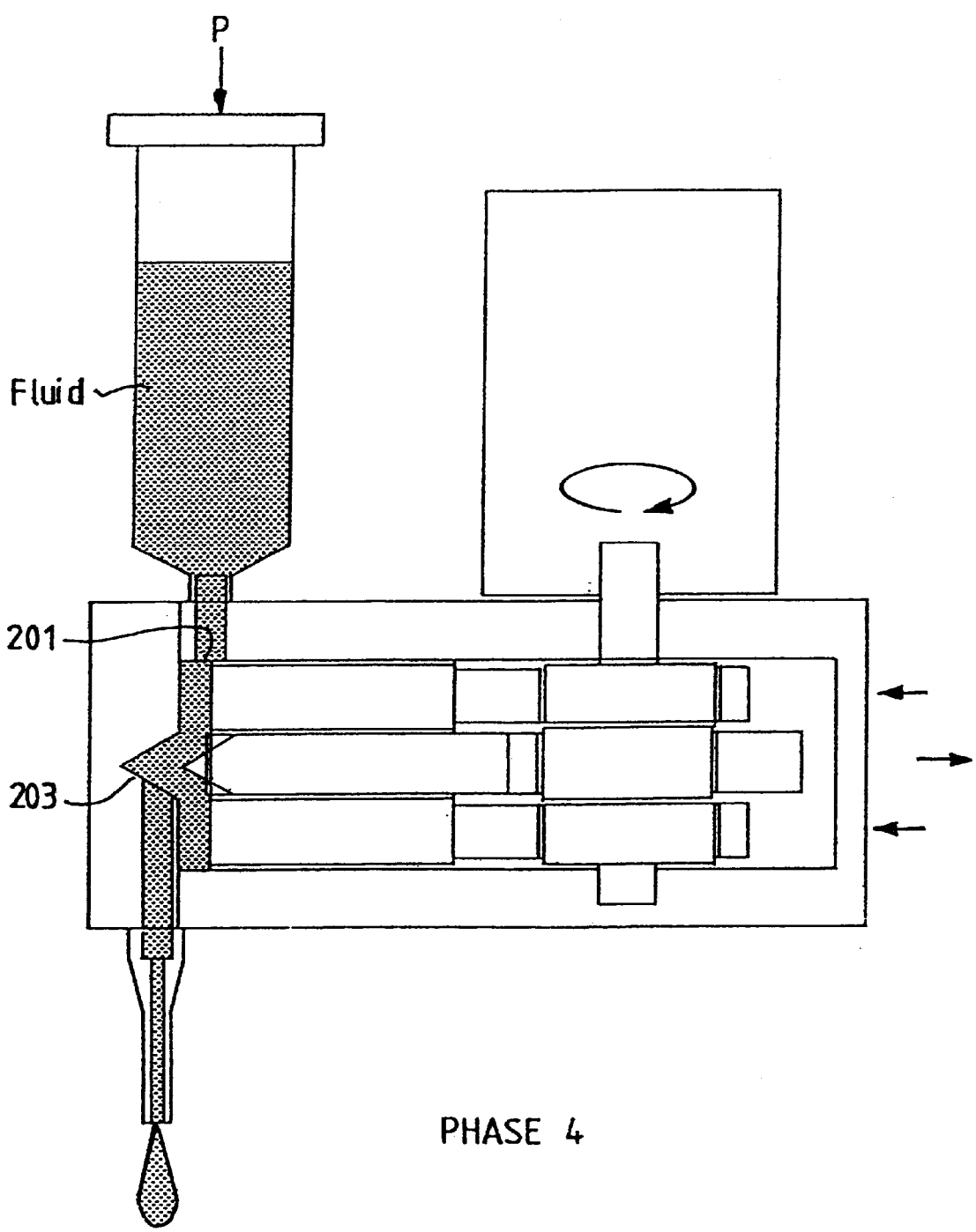

The movement of the inner piston 105 opens and closes the dispensing vent. In the initial position (phase 1), shown in FIG. 2, the outer piston 103 closes the inlet 201, while the inner piston 105 leaves completely open the outlet 203. Then, as shown in FIG. 3 (phase 2), the outer piston 103 moves back opening the inlet 201 and draws the viscous fluid from the reservoir into the chamber, while the inner piston 105 pushes the viscous fluid out of the outlet 203. When the pistons reach the end of the stroke (phase 3) as shown in FIG. 4, the inlet is completely open and the outlet is closed, but only for an instant, because then during phase 4, the inner piston moves back opening the outlet 203 again, while the outer piston pushes the fluid out of the outlet 203 and through the needle 107. The cycle then starts again from phase 1. It should be noted that with the exception of the instant extreme positions corresponding to phase 1 and phase 3, one of the two pistons is always pushing the viscous fluid out of the outlet aperture 203, so that continuous dispensing is realized.

According to the present invention the two pistons 103 and 105 have been described as two concentric cylinders. Those skilled in the art will appreciate that other possible designs may be used provided that the two pistons move in anti-phase and that one of them is always pushing the viscous fluid out of the outlet and through the needle (with the instant exception of the phase 1 and 3).

In order to provide a constant dispensing action it is necessary that the pushing action of the two pistons is substantially the same. This can be accomplished by varying some of the pump parameters and dimensions, e.g. the volume of the chamber 117, the relationship between the surfaces of the head of the pistons 103 and 105 and the eccentricity of the cams.

According to a preferred embodiment of the present invention, in order to provide a constant dispensing action, the two pistons are designed so that the pushing action of each piston is substantially the same but, to maintain a definite flow direction toward the dispensing action (material out of the needle) there is the need to adjust some of the parameters and dimensions of the pump elements.

This is accomplished by defining the ratio between the two volumes in the chamber when the two pistons are reciprocally in the extreme positions. According to a preferred embodiment of the present invention, the volume of the outer portion of the loading chamber (e.g. as in FIG. 4) is about 5% larger than the volume available in the inner portion (e.g. as in FIG. 2), the purpose of this being to maintain a direction flow toward the dispensing needle. This relative volume difference is difficult to be achieved changing only the piston geometries; for this reason in a preferred embodiment of the present invention the length of the stroke of the two pistons is different. This different stroke length for the pistons is accomplished by changing the eccentricity of the cams on the cam shaft, with the inner piston having a shorter stroke than the external piston.

The quantity of material dispensed in the unit of time can be adjusted in the ranges of the mg (fine tuning) by either modifying the rotation speed of the cam (revolution/minute) or by changing the chamber configuration and/or structural changes maintaining the overall engineered proportions.

The pump according to a preferred embodiment of the present invention can ideally dispense from a minimum of 1 mg/sec to 1 g/sec for fluids with a viscosity from 2,000,000 cps (Centipoise equivalent to Pascal×sec×$10^{-3}$) down to 10,000 cps. Such flexibility in the range of viscosity extends the application fields of this pump to microelectronics as well as automotive, consumer products, and other areas of manufacturing.

According to a preferred embodiment of the present invention, the pump does not utilize valves or other complex devices.

The absence of any valves in the pump structure is a great advantage for ease of operation and maintenance of the pump. A valve would require an auxiliary system (e.g. pneumatic or electrical), which would add some complexity to the system as the valve requires time to be activated/deactivated causing a delay in opening/closing operations. Furthermore, valves need to be carefully cleaned between cycles or filled with inert material when stored, this makes it difficult to switch materials during a production flow, if contamination between materials is a critical aspect in the application. Also material flow, usually polymers with some particle loading, could wear out the shiny polished and precisely matching parts of the valve, causing these parts to alter their matching surfaces, with leakages possibly occurring.

What is claimed is:

1. A pump for dispensing viscous fluid comprising:

a housing defining a chamber therein including an inlet aperture, being connectable with a reservoir, and a dispensing outlet aperture, first and second pistons located within said chamber, said first and said second pistons being movable in anti-phase, said first piston, in use, reciprocatingly moving in said chamber to periodically open and close said inlet aperture, and said second piston, in use, reciprocatingly moving in said chamber to periodically open and close said outlet aperture.

2. The pump of claim 1 wherein said first and said second pistons are each connected to at least one separate cam member so that rotation of said separate cam members cause said first and said second pistons to move in said reciprocating manner.

3. The pump of claim 2 wherein said separate cam members are positioned on a common shaft.

4. The pump of claim 2 wherein two of said separate cams are connected to said first piston and one of said separate cams is connected to said second piston.

5. The pump of claim 1 wherein said first piston is a sleeve member and said second piston is located within said sleeve member.

6. The pump of claim 5 wherein the volume of said chamber when said first piston is in an extreme position such that said inlet aperture is open, is about 5% greater than the volume of said chamber when said second piston is in an extreme position such that said inlet aperture is closed.

7. The invention of claim 1 wherein said pump dispenses a continuous flow of viscous fluid material.

8. The invention of claim 7 wherein said viscous fluid material is continuously being pushed by at least one of said first and second pistons out of said dispensing outlet aperture when said pistons are moving within said chamber.

9. The invention of claim 1 wherein said pump does not utilize valves as part thereof.

10. The invention of claim 1 wherein said pump is capable of dispensing viscous fluid materials having a viscosity ranging from about 10,000 centipoise to about 2,000,000 centipoise.

* * * * *